United States Patent
Kiviranta et al.

(10) Patent No.: US 11,321,932 B1
(45) Date of Patent: May 3, 2022

(54) METHODS AND SYSTEMS FOR ALIGNING MANIPULATIONS IN TIME AND SPACE

(71) Applicant: Delta Cygni Labs Oy, Tampere (FI)

(72) Inventors: Sauli Kiviranta, Tampere (FI); Boris Krassi, Tampere (FI); Igor Levochkin, Tampere (FI); Teemu Kumpumäki, Tampere (FI)

(73) Assignee: Delta Cygni Labs Oy, Tampere (FI)

( * ) Notice: Subject to any disclaimer, the term of this patent is extended or adjusted under 35 U.S.C. 154(b) by 0 days.

(21) Appl. No.: 17/326,793

(22) Filed: May 21, 2021

(51) Int. Cl.
*G06T 19/00* (2011.01)
*G06T 15/00* (2011.01)

(52) U.S. Cl.
CPC .......... *G06T 19/006* (2013.01); *G06T 15/005* (2013.01); *G06T 2219/024* (2013.01); *G06T 2219/2016* (2013.01)

(58) Field of Classification Search
None
See application file for complete search history.

(56) References Cited

U.S. PATENT DOCUMENTS

| | | | |
|---|---|---|---|
| 2013/0120367 A1* | 5/2013 | Miller | G06T 15/20 345/419 |
| 2013/0144566 A1* | 6/2013 | De Biswas | H04W 4/21 703/1 |
| 2021/0096553 A1* | 4/2021 | Stump | G06Q 10/101 |

\* cited by examiner

*Primary Examiner* — Michael J Cobb
(74) *Attorney, Agent, or Firm* — Ziegler IP Law Group, LLC

(57) ABSTRACT

A method for aligning manipulations in time and space to first model of three-dimensional (3D) real-world object in second model of 3D real-world environment said method includes: generating, by first terminal device, third model based on first model and second model, from first point of view; transmitting third model and timing metadata to second terminal device(s); receiving third model and timing metadata at second terminal device(s); manipulating third model by second terminal device(s); creating manipulation information; transmitting manipulation information from second terminal device(s) to first terminal device; receiving manipulation information at first terminal device; updating, by first terminal device, first model and second model from second point of view; and aligning, by first terminal device, manipulation information in time and space.

21 Claims, 5 Drawing Sheets

METHODS AND SYSTEMS FOR ALIGNING MANIPULATIONS IN TIME AND SPACE

TECHNICAL FIELD

The present disclosure relates to methods for aligning manipulations in time and space to models of three-dimensional real-world objects. The present disclosure also relates to systems for aligning manipulations in time and space to models of three-dimensional real-world objects. The present disclosure further relates to computer program products for aligning manipulations in time and space to models of three-dimensional real-world objects.

BACKGROUND

Nowadays, several advancements are being made to develop interactive spatiotemporal collaboration that allows multiple users who are distributed in time and space, to simultaneously virtually interact and co-work on a common subject. Systems implementing such interactive spatiotemporal collaboration makes use of evolving technologies such as immersive extended reality (XR) technologies which are employed in various fields such as entertainment, real estate, training, medical imaging operations, simulators, navigation, engineering, manufacturing, industrial services, and the like. As an example, multiple users may be co-working in a virtual or augmented reality space.

However, such existing systems suffer from several limitations. Firstly, these systems are insufficient in terms of aligning data pertaining to manipulations performed, for example, on a model, by multiple users who are distributed in time and space. In such a case, the manipulations are reflected with inconsistencies due to communication channel latencies, variance in latency, limited bandwidth, at devices associated with the multiple users, the devices associated being communicably coupled together. Moreover, spatiotemporal awareness is different for different users who are distributed in time and space. For example, different users may have different dynamic physical elements around them, and these physical elements might affect the alignment of the manipulations. Secondly, the existing systems are prone to communication errors (such as communication network failures). As an example, information pertaining to a model created at a first device may not be fully available to a second device coupled to the first device, due to a communication network failure. Moreover, when in operation, there could also be power failures of the devices that affects data transmission between devices. Thirdly, the existing systems employ a centralized cloud for storing up-to-date information for all the devices and for remotely accessing such information. Solely relying on such a centralized cloud requires high power, high security and maintenance, and is expensive. Fourthly, the existing systems employ a decentralized peer-to-peer communication for aligning information across all of the devices. Solely relying on such a decentralized peer-to-peer communication requires high power, has inherently low security and high maintenance, and is prone to errors. Fifthly, the existing systems communicate all information (such as all coordinates, orientations, positions, and the like of the models) between the devices even if only a portion of the information is required to be communicated to achieve alignment. Due to this, a high bandwidth is required by communication networks and considerable time is required to transmit/retrieve a high amount of data between the devices which leads to latencies.

Therefore, in light of the foregoing discussion, there exists a need to overcome the aforementioned drawbacks associated with existing systems implementing interactive spatiotemporal collaboration for users distributed in time and space.

SUMMARY

The present disclosure seeks to provide a method for aligning manipulations in time and space to a model of three-dimensional real-world object. The present disclosure also seeks to provide a system for aligning manipulations in time and space to a model of three-dimensional real-world object. The present disclosure further seeks to provide a computer program product for aligning manipulations in time and space to a model of three-dimensional real-world object. An aim of the present disclosure is to provide a solution that overcomes at least partially the problems encountered in prior art.

In one aspect, an embodiment of the present disclosure provides a method for aligning manipulations in time and space to a first model of a three-dimensional real-world object in a second model of a three-dimensional real-world environment said method comprising:

generating, by a first terminal device from among a plurality of terminal devices, a third model based on the first model and the second model, in a global co-ordinate system associated with the second model, from a first point of view (p1) of the first terminal device in relation to the three-dimensional object in the three-dimensional real-word environment at a first instance of time corresponding to a first timestamp (t1) in a first time system, which the first time system is associated with the first terminal device;

transmitting the third model and a timing metadata associated with the first timestamp (t1) in the first time system associated with the first terminal device by the first terminal device to at least one second terminal device from among the plurality of terminal devices, at a second instance of time corresponding to a second timestamp (t2) in the first time system;

receiving the third model and the timing metadata at the at least one second terminal device at a third instance of time corresponding to a third timestamp (t3) in the first time system associated with the first terminal device;

manipulating the received third model by the at least one second terminal device at a fourth instance of time corresponding to a fourth timestamp (t4) in the first time system associated with the first terminal device;

creating a manipulation information based on the manipulations associated with the timing metadata of the first timestamp (t1) at a fifth instance of time corresponding to a fifth timestamp (t5) in the first time system associated with the first terminal device;

transmitting the manipulation information from the at least one second terminal device to the first terminal device at a sixth instance of time corresponding to a sixth timestamp (t6) in the first time system associated with the first terminal device;

receiving the manipulation information at the first terminal device at a seventh instance of time corresponding to a seventh timestamp (t7) in the first time system associated with the first terminal device;

updating, by the first terminal device, the first model and the second model, in the global co-ordinate system associated with the second model, from a second point of view (p2) of the first terminal device in relation to the three-dimensional object in the three-dimensional real-word environment at an eighth instance of time corresponding to an eighth timestamp (t8) in the first time system, which the first time system is associated with the first terminal device; and aligning, by the first terminal device the manipulation information, in time and space at a ninth instance of time corresponding to a ninth timestamp (t9) in the first time system associated with the first terminal device by mapping the manipulation information, from the first model and the second model, which the models correspond to the first timestamp (t1) from the first point of view (p1), to the updated first model and the updated second model, which the updated models correspond to the eighth timestamp (t8) from the second point of view (p2).

In another aspect, an embodiment of the present disclosure provides a system for aligning manipulations in time and space to a first model of a three-dimensional real-world object in a second model of a three-dimensional real-world environment, said system comprising:

a first terminal device from among a plurality of terminal devices, associated with the three-dimensional real-word environment, operating in a first time system;

at least one second terminal device from among the plurality of terminal devices, associated with the same or another three-dimensional real-world environment, operating in a second time system; and a communication network for providing communicative accessibility between at least the first terminal device and the second terminal device, wherein:

the first terminal device is configured to:

generate a third model based on the first model and the second model, in a global co-ordinate system associated with the second model, from a first point of view (p1) of the first terminal device in relation to the three-dimensional object in the three-dimensional real-word environment at a first instance of time corresponding to a first timestamp (t1) in the first time system;

and transmit, via the communication network, the third model and a timing metadata associated with the first timestamp (t1) in the first time system to the at least one second terminal device, at a second instance of time corresponding to a second timestamp (t2) in the first time system; and the at least one second terminal device is configured to:

receive the third model and a timing metadata at a third instance of time corresponding to a third timestamp (t3) in the first time system associated with the first terminal device;

manipulate the third model at a fourth instance of time corresponding to a fourth timestamp (t4) in the first time system associated with the first terminal device;

create a manipulation information based on the manipulations associated with the timing metadata of the first timestamp (t1) at a fifth instance of time corresponding to a fifth timestamp (t5) in the first time system associated with the first terminal device; and transmit, via the communication network, the manipulation information to the first terminal device at a sixth instance of time corresponding to a sixth timestamp (t6) in the first time system associated with the first terminal device; and the first terminal device is further configured to:

receive, via the communication network, the manipulation information at a seventh instance of time corresponding to a seventh timestamp (t7) in the first time system;

update the first model and the second model, in a global co-ordinate system associated with the second model, from a second point of view (p2) of the first terminal device in relation to the three-dimensional object in the three-dimensional real-word environment at an eighth instance of time corresponding to an eighth timestamp (t8) in the first time system; and aligning the manipulation information, in time and space at a ninth instance of time corresponding to a ninth timestamp (t9) in the first time system associated with the first terminal device by mapping the manipulation information, from the first model and the second model, which the models correspond to the first timestamp (t1) from the first point of view (p1), to the updated first model and the updated second model, which the updated models correspond to the eighth timestamp (t8) from the second point of view (p2).

In yet another aspect, an embodiment of the present disclosure provides a computer program product comprising a non-transitory computer-readable storage medium having computer-readable instructions stored thereon, the computer-readable instructions being executable by at least one of a terminal device from among a plurality of terminal devices or by at least one of the central nodes from among a plurality of central nodes, comprising processing hardware to execute a method of the aforementioned aspect.

Embodiments of the present disclosure substantially eliminate or at least partially address the aforementioned problems in the prior art, and enable efficient, accurate, and reliable alignment of manipulations in time and space, in real time or near real time.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1A:
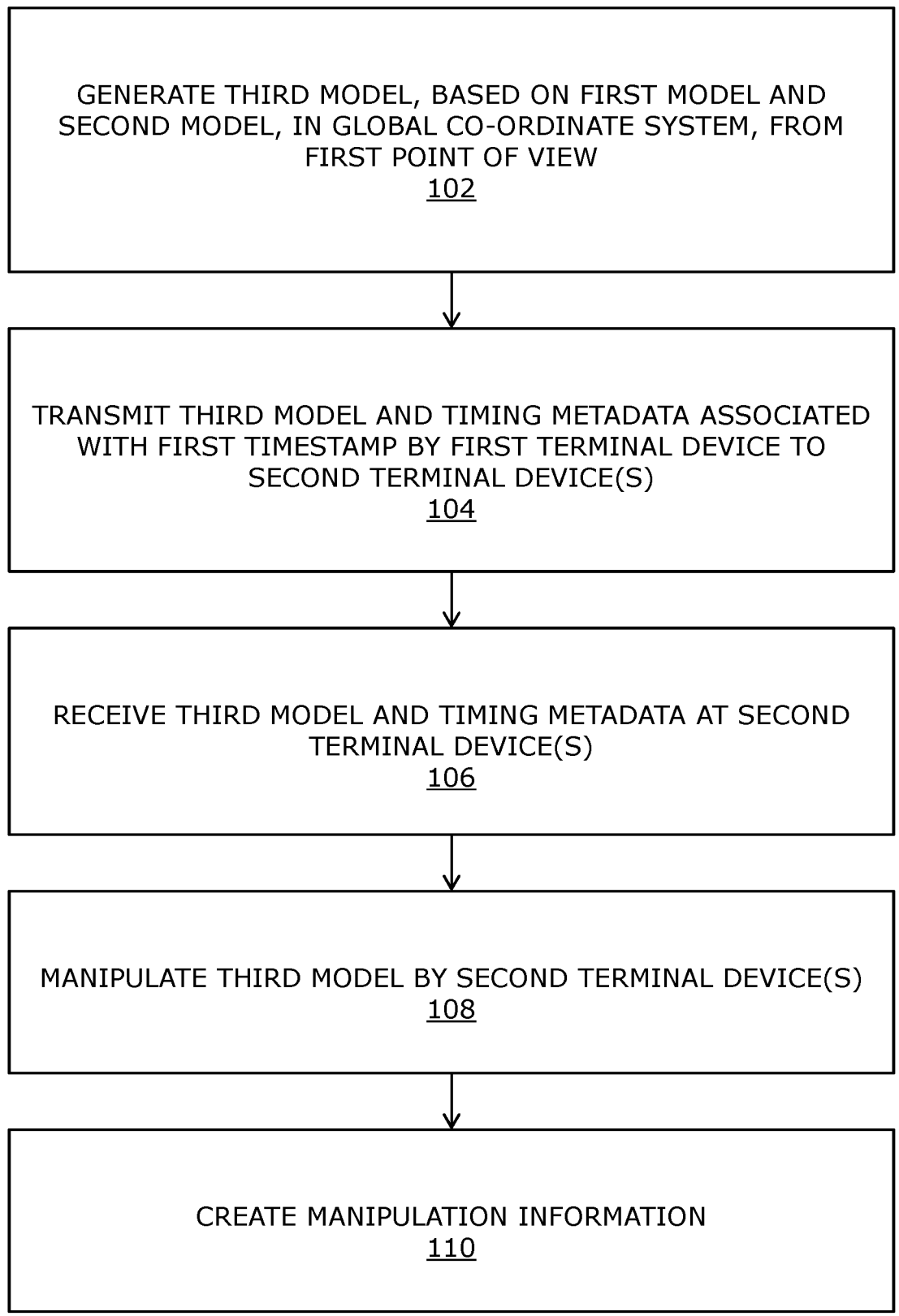
FIGS. 1A and 1B illustrate steps of a method for aligning manipulations in time and space to a first model of a three-dimensional real-world object in a second model of a three-dimensional real-world environment, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a method for aligning manipulations in time and space to a first model of a three-dimensional real-world object in a second model of a three-dimensional real-world environment said method comprising:

generating, by a first terminal device from among a plurality of terminal devices, a third model based on the first model and the second model, in a global co-ordinate system associated with the second model, from a first point of view (p1) of the first terminal device in relation to the three-dimensional object in the three-dimensional real-word environment at a first instance of time corresponding to a first timestamp (t1) in a first time system, which the first time system is associated with the first terminal device;

transmitting the third model and a timing metadata associated with the first timestamp (t1) in the first time system associated with the first terminal device by the first terminal device to at least one second terminal device from among the plurality of terminal devices, at a second instance of time corresponding to a second timestamp (t2) in the first time system;

receiving the third model and the timing metadata at the at least one second terminal device at a third instance of time corresponding to a third timestamp (t3) in the first time system associated with the first terminal device;

manipulating the received third model by the at least one second terminal device at a fourth instance of time corresponding to a fourth timestamp (t4) in the first time system associated with the first terminal device;

creating a manipulation information based on the manipulations associated with the timing metadata of the first timestamp (t1) at a fifth instance of time corresponding to a fifth timestamp (t5) in the first time system associated with the first terminal device;

transmitting the manipulation information from the at least one second terminal device to the first terminal device at a sixth instance of time corresponding to a sixth timestamp (t6) in the first time system associated with the first terminal device;

receiving the manipulation information at the first terminal device at a seventh instance of time corresponding to a seventh timestamp (t7) in the first time system associated with the first terminal device;

updating, by the first terminal device, the first model and the second model, in the global co-ordinate system associated with the second model, from a second point of view (p2) of the first terminal device in relation to the three-dimensional object in the three-dimensional real-word environment at an eighth instance of time corresponding to an eighth timestamp (t8) in the first time system, which the first time system is associated with the first terminal device; and aligning, by the first terminal device the manipulation information, in time and space at a ninth instance of time corresponding to a ninth timestamp (t9) in the first time system associated with the first terminal device by mapping the manipulation information, from the first model and the second model, which the models correspond to the first timestamp (t1) from the first point of view (p1), to the updated first model and the updated second model, which the updated models correspond to the eighth timestamp (t8) from the second point of view (p2).

In another aspect, an embodiment of the present disclosure provides a system for aligning manipulations in time and space to a first model of a three-dimensional real-world object in a second model of a three-dimensional real-world environment, said system comprising:

a first terminal device from among a plurality of terminal devices, associated with the three-dimensional real-word environment, operating in a first time system;

at least one second terminal device from among the plurality of terminal devices, associated with the same or another three-dimensional real-world environment, operating in a second time system; and a communication network for providing communicative accessibility between at least the first terminal device and the second terminal device, wherein:

the first terminal device is configured to:

generate a third model based on the first model and the second model, in a global co-ordinate system associated with the second model, from a first point of view (p1) of the first terminal device in relation to the three-dimensional object in the three-dimensional real-word environment at a first instance of time corresponding to a first timestamp (t1) in the first time system;

and transmit, via the communication network, the third model and a timing metadata associated with the first timestamp (t1) in the first time system to the at least one second terminal device, at a second instance of time corresponding to a second timestamp (t2) in the first time system; and the at least one second terminal device is configured to:

receive the third model and a timing metadata at a third instance of time corresponding to a third timestamp (t3) in the first time system associated with the first terminal device;

manipulate the third model at a fourth instance of time corresponding to a fourth timestamp (t4) in the first time system associated with the first terminal device;

create a manipulation information based on the manipulations associated with the timing metadata of the first timestamp (t1) at a fifth instance of time corresponding to a fifth timestamp (t5) in the first time system associated with the first terminal device; and transmit, via the communication network, the manipulation information to the first terminal device at a sixth instance of time corresponding to a sixth timestamp (t6) in the first time system associated with the first terminal device; and the first terminal device is further configured to:

receive, via the communication network, the manipulation information at a seventh instance of time corresponding to a seventh timestamp (t7) in the first time system;

update the first model and the second model, in a global co-ordinate system associated with the second model, from a second point of view (p2) of the first terminal device in relation to the three-dimensional object in the three-dimensional real-word environment at an eighth instance of time corresponding to an eighth timestamp (t8) in the first time system; and aligning the manipulation information, in time and space at a ninth instance of time corresponding to a ninth timestamp (t9) in the first time system associated with the first terminal device by mapping the manipulation information, from the first model and the second model, which the models correspond to the first timestamp (t1) from the first point of view (p1), to the updated first model and the updated second model, which the updated models correspond to the eighth timestamp (t8) from the second point of view (p2).

In yet another aspect, an embodiment of the present disclosure provides a computer program product comprising a non-transitory computer-readable storage medium having computer-readable instructions stored thereon, the computer-readable instructions being executable by at least one of a terminal device from among a plurality of terminal devices or by at least one of the central nodes from among a plurality of central nodes, comprising processing hardware to execute a method of the aforementioned aspect.

The present disclosure provides the aforementioned method, the aforementioned system, and the aforementioned computer program product for aligning manipulations in time and space to a first model of a three-dimensional real-world object in a second model of a three-dimensional real-world environment. The method enables accurate spatiotemporal alignment of data pertaining to the manipulations on different models by multiple users who are distributed in time and space. In such a case, the manipulations are aligned in real time or near real time in order to generate updated first and second model. Beneficially, the method and the system are resilient to latency, variance in latency, communication errors or disconnection in the communication network. Moreover, the method employs localized terminal devices and/or central nodes for storing and distributing up-to-date information for all the models and for remotely accessing such information. This requires relatively little power and maintenance, and is cost-effective. The method facilitates transmission and retrieval of only requisite manipulation information (for example requisite coordinates, orientations, positions, and the like of a model) in form of snapshots, between the terminal devices. Advantageously, in such a case, a low bandwidth is required by communication network for data communication, and time required to transmit/retrieve manipulation information between the devices is minimal. The method is fast, effective, reliable and can be implemented with ease.

It will be appreciated that the method facilitates aligning manipulations in the time and space in real time or near real time. Throughout the present disclosure, the term "terminal device" refers to hardware, software, firmware, or a combination of these. Examples of a given terminal device may include, but are not limited to, a computer, a laptop, smart glasses, smartphone, a processing device. The plurality of terminal devices participate in control operations of the system. The plurality of terminal devices are communicably coupled together wirelessly and/or in a wired manner via a communication network. Examples of the communication network may include, but are not limited to, Internet, a local network (such as, a TCP/IP-based network, an Ethernet-based local area network, an Ethernet-based personal area network, a Wi-Fi network, and the like), Wide Area Networks (WANs), Metropolitan Area Networks (MANs), a telecommunication network, and a radio network. In an example, the plurality of terminal devices may be communicably coupled together via the Internet. It may be understood that the "terminal device" is sometimes referred to as "terminal" in the description. The plurality of terminal devices comprise at least the first terminal device and the at least one second terminal device. The at least one terminal device is configured to analyze time-based manipulations in a given model and make conflict resolution of such manipulations, if needed, based on a rule set. Optionally, the plurality of terminal devices further comprise at least one central node. The at least one central node may be employed for facilitating communication and for keeping up-to-date on the manipulation/changes. The at least one central node is configured to analyze time-based manipulations in a given model and make conflict resolution of such manipulations, if needed, based on a rule set. As an example, if date and/or time associated with a given terminal device is/are not in alignment, some manipulations may eventually lead to conflicts and conflict resolution of such manipulations may be required. It will be appreciated that a virtual model is a computer-generated model that is generated by the given terminal device.

Optionally, the global co-ordinate system is a coordinate system having a predefined origin and three coordinate axes. The three coordinate axes could be, for example, X, Y, and Z axes, wherein the Z axis lies in a direction such that gravity acts in an opposite direction to the direction of the Z axis. Optionally, a three-dimensional (3D) position in the global co-ordinate system is expressed as (x, y, z) position coordinates along the X, Y and Z axes, respectively. The global co-ordinate system (namely, a universal co-ordinate system) defines origin of a given 3D real-world object in the 3D real-world environment in the second model. Optionally, the given 3D object is associated with a local co-coordinate system that is defined with respect to the origin of the given 3D real-world object in the 3D real-world environment. The local co-ordinate system may be utilized to express a pose of the 3D real-world object with respect to the 3D real-world environment. The term "pose" encompasses both position and orientation of the 3D real-world object and the model representing it.

The term "timestamp" refers to information pertaining to occurrence of an event. Optionally, a given timestamp comprises date and/or time of occurrence of the event. Optionally, the first timestamp comprises date and/or time of generation of the third model. It will be appreciated that the given timestamp is defined according to a given time system. The term "time system" refers to a time zone system that defines a uniform standard time associated with the given terminal device. Optionally, a given time system is defined as an offset from Coordinated Universal Time (UTC) or a cosmocentric time system. Optionally, the given time system lies in a range of UTC-12:00 to UTC+14:00. The plurality of terminals may have different time systems.

Optionally, the first model comprises a virtual model, which comprises at least one of: a virtual model associated with a real-world object, a virtual model associated with an augmented reality object, a virtual model associated with a mixed reality object or a virtual model associated with a virtual reality object. Optionally, when the virtual model is associated with the real-world object, the first terminal device utilizes sensory measurements of the real-world object captured from instances in time and space, to generate the virtual model associated with the real-world object. Examples of the real-world object may include, but are not limited to, a book, a toy, a vehicle, a box, a gadget, a bookshelf, a room. Optionally, when the virtual model comprises at least one of: the virtual model associated with the augmented reality object, the virtual model associated with the mixed reality object, the virtual model associated with the virtual reality object, the first terminal device utilizes computer-generated content to generate the virtual model(s). The computer-generated content (namely, a digital content or a virtual content) may comprise at least one virtual object. Examples of the at least one virtual object may include, but are not limited to, a virtual navigation tool (such as a virtual map, a virtual direction signage, and so forth), a virtual gadget (such as a virtual calculator, a virtual computer, and so forth), a virtual message (such as a virtual instant message, a virtual chat conversation, a virtual to-do note, and so forth), a virtual entity (such as a virtual person, a virtual animal, a virtual ghost, and so forth), a virtual entertainment media (such as a virtual painting, a virtual video, a virtual interactive advertisement, and so forth), a virtual vehicle or part thereof (such as a virtual car, a virtual cockpit, and so forth), and a virtual information (such as a virtual news description, a virtual announcement, virtual data, and so forth). It will be appreciated that such a virtual model of the first model captures arbitrary complexity and heterogenic nature of real objects with dynamic properties by creating homomorphism of adequate complexity between the real world object and its model. It will also be appreciated that this facilitates aligning the manipulations in time and space, and thereby enables interactive spatiotemporal collaboration that allows multiple users who are distributed in time and space, to simultaneously virtually interact and co-work with maximal immersive properties. It will also be appreciated that the terms "virtual reality", "augmented reality", "mixed reality" may collectively be referred to as "extended reality".

Optionally, the second model comprises a virtual model which comprises at least one of: a virtual model associated with a real-world environment, a virtual model associated with an augmented reality environment, a virtual model associated with a mixed reality environment or a virtual model associated with a virtual reality environment. Optionally, when the virtual model is associated with the real-world environment, the first terminal device utilizes sensory measurements of the real-world environment captured from instances in time and space, to generate the virtual model associated with the real-world environment. Optionally, the real-world environment includes at least the real-world object. Optionally, the virtual model associated with the augmented reality environment, the virtual model associated with the mixed reality environment, and the virtual model associated with the virtual reality environment, are generated by the first terminal device, based on an extended reality (XR) application. The XR application may be an XR game application, an XR tutorial, an XR instructional simulator, an XR movie, an XR educational video, and the like. It will be appreciated that such a virtual model of the second model captures arbitrary complexity and heterogenic nature of real world environment with dynamic properties by creating homomorphism of adequate complexity between the real world environment and its model. It will be also appreciated that this facilitates aligning the manipulations in time and space, and thereby enables interactive spatiotemporal collaboration that allows multiple users who are distributed in time and space, to simultaneously virtually interact and co-work with maximal immersive properties. It will be appreciated that the alignment is created in a model based fashion, in contrast to the command based procedural fashion, this greatly reduces interpretation complexity of alignment process when alignment in time and space is done from several manipulation information in real time or near real time, and can be performed by taking a projection of the multitude of manipulation information resulting in homomorphically mapped adequate version of the manipulation information thereby facilitating in aligning the manipulations in time and space to the first model and second model without any errors or extra latencies through minimization of resource usage. It will also be appreciated that the first model and the second model can be 3D models, and thus could be represented for example, by a point cloud.

Optionally, the third model comprises a virtual model which comprises at least one of: a virtual model associated with the first model, a virtual model associated with the second model, a virtual model associated with composite of any of the models as a partial virtual model or as a complete virtual model, a position data, an orientation data, timing metadata, the timing metadata comprising at least an information about a time line of the third model in the form of a timestamp in the first time system associated with the first terminal device.

Notably, the third model is generated from a first perspective of the first terminal device in relation to the 3D real-world object in the 3D real-world environment. In other words, the third model comprises at least two-dimensional (2D) model such as an image of the 3D real-world object from the first point of view at the first instance of time corresponding to the first timestamp.

Optionally, when the virtual model of the third model is associated with the first model, the virtual model of the third model comprises 2D models such as images of the (3D) real-world object from the first point of view at the first instance of time corresponding to the first timestamp. Additionally or alternatively, optionally, when the virtual model of the third model is associated with the second model, the virtual model of the third model comprises 2D models such as images of the (3D) real-world environment from the first point of view at the first instance of time corresponding to the first timestamp. Optionally, the virtual model of the third model is associated as a composite of both the first model and the second model, wherein some part of the virtual model of the third model is associated with the first model and other part of the virtual model of the third model is associated with the second model. The term "position data" refers to information pertaining to position (such as positional coordinates) of the third model in respect to a given model of a real-world object. The term "orientation data" refers to information pertaining to orientation of the third model in respect to a given model of a real-world object.

Herein, the term "timing metadata" refers to information pertaining to the time line of the third model, such as a timestamp that indicates a time and a date of generation of the third model. The third model could have a same complexity as that of the first model and/or the second model, or could be based on a homomorphic model with adequate complexity.

Notably, the third model and the timing metadata is transmitted from the first terminal device at the second instance of time corresponding to the second timestamp. Optionally, the second timestamp comprises date and/or time of transmission of the third model and the timing metadata from the first terminal device to the at least one second terminal device.

Notably, the third model and the timing metadata is received at the least one second terminal device at the third instance of time corresponding to the third timestamp. Optionally, the third timestamp comprises date and/or time of receiving the third model and the timing metadata from the first terminal device to the at least one second terminal device.

When the third model is received by the at least one second terminal device, the third model is manipulated by the at least one second terminal device to update (namely, modify) an existing version of the third model at the fourth instance of time corresponding to the fourth timestamp. Such an updation could be addition of a given sub-model to the third model and/or removal of a given sub-model from the third model. Optionally, the fourth timestamp comprises date and/or time of manipulation of the third model by the at least one second terminal device. It will be appreciated that all the manipulations are tracked locally associated with the plurality of terminal device in respect to their respective time systems. It will be appreciated that such a virtual model of the third model captures arbitrary complexity and heterogenic nature of first model and second model with dynamic properties by creating homomorphism of adequate complexity between the models. It will be also appreciated that this facilitates aligning the third models in time and space, and thereby enables interactive spatiotemporal collaboration that allows multiple users who are distributed in time and space, to simultaneously virtually interact and co-work with maximal immersive properties. It will be also appreciated that the third model may be understood to be a simplified model, or a compressed model (namely, a partial model or a subset model) as compared to the first model and/or the second model. Beneficially, this allows for efficient and fast transmission of the third model and the timing metadata from the first terminal device to the at least one second terminal device, and thus has smaller time and space complexity and as such requires less computational, memory and network resources and is less exposed to errors. It will be also appreciated that the transmission and receival of third model allows bridging the users that are distributed in time and space by removing the necessity of their physical presence and thereby enables interactive spatiotemporal collaboration that allows multiple users who are distributed in time and space, to simultaneously virtually interact and co-work with maximal immersive properties without latencies or errors.

Optionally, the manipulation comprises at least one of: a position data, an orientation data, adding an additional model which comprises a virtual model which comprises at least one of: a virtual model associated with a real-world object, a virtual model associated with an augmented reality object, a virtual model associated with a mixed reality object or a virtual model associated with a virtual reality object. The position data, the orientation data, and the virtual model have been described above in details. Optionally, when the manipulation comprises adding the additional model which comprises the virtual model, the third model is updated by combining the additional model with the third model. In an example, the third model may comprise a 2D model such as an image of a box, and may be manipulated by adding an additional models (such as an arrow) at a location (X1,Y1, Z1) on a surface of the box. Optionally, the manipulation comprises removing an existing model which comprises a virtual model. In such a case, the third model is updated by deleting the existing model from the third model. In an example, the third model may comprise a 2D model such as an image of a gadget, and may be manipulated by removing an existing object (such as a logo or sticker) from a location (X2,Y2,Z2) on a surface of the gadget. It will be appreciated that the manipulations are streamed from one terminal device to another terminal device in real time or as a patch (from time to time). It will be appreciated that the manipulation is enhancing the informational content of the third model, by capturing the intentions of the user locally without errors and extra latencies thus minimizing resource usage.

Notably, the manipulation information is created by the at least one second terminal device for each manipulation done on the third model at the fifth instance of time corresponding to the fifth timestamp. Optionally, the fifth timestamp comprises date and/or time of creation of manipulation information by the at least one second terminal device.

Optionally, the manipulation information comprises at least one of: a position data, an orientation data, a virtual model associated with composite of any of the other models as a partial virtual model or as a complete virtual model, timing metadata, the timing metadata comprising at least an information about a time line of manipulation information in the form of a timestamp in the first time system associated with the first terminal device. The position data, the orientation data, and the virtual model have been described above in details. Herein, the term "timing metadata" refers to information pertaining to the time line of the manipulation information. In an example, the manipulation information may comprise at least one of: positional coordinates of a real-world object in a 2D model such as an image in the third model, positional coordinates of the additional model which comprises the virtual model, information pertaining to timestamps of such manipulations.

Notably, the first terminal device is configured to update the first model and the second model in the global coordinate system, from a second perspective of the first terminal device in relation to the 3D real-world object in the 3D real-world environment. In other words, the first terminal device modifies the first and second models ahead in time and space according to a requisite extent, and eventually with updating of the first model and the second model, the manipulation information is aligned. Optionally, the eighth timestamp comprises date and/or time of updating the first model and the second model.

Following the updating the first model and second model, the first terminal device is configured to align the manipulation information on the updated first model and the updated second model. In this regard, the first terminal device makes alignment in time and space from one or several manipulation information in real time or near real time, by taking a projection of the multitude of manipulation information, that are based on the first model and second model, by mapping onto the updated first model and second model thus achieving homomorphically adequate version of the aligned first model and aligned second model. Optionally, using the manipulation information (such as positional coordinates of a real-world object in the manipulation information) in order to translate a partial (2D) model mapping back to a complete (3D) model. Optionally, the first terminal device utilizes a ray casting method to make the ray cast using the manipulation information.

Optionally, the sixth timestamp comprises date and/or time of transmitting the manipulation information by the at least one second terminal device to the first terminal device. The manipulation information is received at the first terminal device at the seventh instance of time corresponding to the seventh timestamp. Optionally, the seventh timestamp comprises date and/or time of receiving the manipulation information at the first terminal device. It will be appreciated that such a manipulation information captures arbitrary complexity and heterogenic nature of manipulations with dynamic properties by creating homomorphism of adequate complexity between the manipulations and the third model. It will be appreciated that the manipulation information is created in a model based fashion, by taking a projection of the manipulations to the third model resulting in homomorphically mapped adequate version of the manipulation information thereby facilitating in aligning the models in time and space without any errors or extra latencies through minimization of resource usage. It will be also appreciated that this facilitates aligning the manipulation information in time and space, and thereby enables interactive spatiotemporal collaboration that allows multiple users who are distributed in time and space, to simultaneously virtually interact and co-work with maximal immersive properties. It will be also appreciated that the manipulation information may be understood to be a simplified model, or a compressed model (namely, a partial model or a subset model) as compared to all of the manipulations. Beneficially, this allows for efficient and fast transmission of the manipulation information and the timing metadata from the second terminal device to the first terminal device, and thus has smaller time and space complexity and as such requires less computational, memory and network resources and is less exposed to errors. It will be also appreciated that the transmission and receival of manipulation information allows bridging the users that are distributed in time and space by removing the necessity of their physical presence and thereby enables interactive spatiotemporal collaboration that allows multiple users who are distributed in time and space, to simultaneously virtually interact and co-work with maximal immersive properties without latencies or errors.

Optionally, the creation of the manipulation information comprises snapping, by the at least one second terminal device at the fifth instance of time corresponding to the fifth timestamp ($t_5$) in the first time system associated with the first terminal device by mapping the manipulation information, from the third model, which the third model correspond to the first timestamp (t1) from the first point of view (p1), to the updated third model, which the updated third model correspond to the first timestamp (t1) from the first point of view (p1). In this regard, the manipulation information is created by taking a snapshot of the mapping between the third model and the updated third model. In such a case, the manipulation information for a given region of the third model is created by taking a snapshot of mapping of the given region of the third model and a corresponding region of the updated model. It will be appreciated that creating the manipulation information by snapping facilitates instant alignment of manipulation information on the third model thus requiring less resources and minimal alignment time thus providing far superior user experience. It will be also appreciated that such a manner of aligning (fast forwarding) the manipulation information to the aligned third model model facilitates accurate real time or near real time reflection of manipulations (that have been performed on third model which correspond to the first timestamp from the first point of view) to the aligned third model. Beneficially, this enables an accurate and real time alignment between the models generated by the terminal device, and thus capable of a simultaneous object manipulation. Moreover, the aforesaid manner of aligning the manipulation is resilient to latency, variance in latency, or disconnection in the communication network.

Optionally, the method further comprises recording at least one of the models by at least one of the terminals as a change file along with a timestamp in a time system, which the time system is associated with a respective terminal device; and transmitting the change files across time and space to at least one of the terminal devices or central nodes among the plurality of terminal devices and central nodes in one of: a) real-time and b) periodically in batches. The term "change file" refers to a file which stores a record of manipulations on a given model by at least one of the terminals along with timestamps of such manipulations. The change file may comprise parameters, metadata, structure, and the like of the manipulations on the given model, which are beneficially utilized by other terminal devices to align manipulations in time and space. Optionally, the change file is associated with global timestamps. The change file may store manipulations of a given real-world object in the given model.

Optionally, a real-time transmission of the change file relates to transmission of the change file as soon as the manipulation is observed/recorded for the given model. In other words, the change file is instantaneously transmitted from a given terminal device to another terminal device. Alternatively, optionally, a periodic transmission of the change file in batches relates to storing several manipulations over a period of time in one change file, and then transmitting the change file. Herein, the change file entails information regarding a plurality of manipulations observed by at least one of the terminals, which are transmitted at once. In an example, the change file may be transmitted periodically in batches after every 10 seconds or may be transmitted intermittently in batches after 10 seconds, and then again after 30 seconds. Optionally, the change file is transmitted based on user-input. It will be appreciated that the change file comprises up-to-date records of manipulations which enables aligning the manipulations consistently without any latency or access to network connectivity. It will be also appreciated that the change file is recorded by the terminal device, said recording would be fast when manipulations are recorded by corresponding individual terminal, and thus require minimal resources of the central nodes while also providing superior user experience in any subsequent retrievals and modifications of the models.

Optionally, the method further comprises recording at least one of the models by at least one of the central nodes as a change file along with a timestamp in a third time system, which the third time system is associated with the central nodes; and transmit the change files across time and space to at least one of the terminal devices or central nodes among the plurality of terminal devices and central nodes in one of: a) real-time and b) periodically in batches. The third time system pertains to the global time system that is associated with the central nodes. The change file stores a record of manipulations on a given model along with timestamps of such manipulations. It will be appreciated that the change file comprises up-to-date records of manipulations which enables aligning the manipulations consistently regardless of specific terminal device availability or access to it. It will be also appreciated that the change file is recorded by one or more central nodes, said recording would be recoverable when manipulations would be stored from the corresponding individual terminals, and thus require minimal resources of the terminal devices while also providing superior user experience in any subsequent retrievals and modifications to the models on other terminals.

Optionally, the method further comprises moderating a communication between at least one of the terminal devices and another terminal device or at least one of the terminal devices and one of the central nodes by at least one central node, wherein the central node is configured to receive the third model and align in time and space the third model into an aligned third model and transmit the aligned third model across time and space to at least one of the terminal devices or central nodes among the plurality of terminal devices and central nodes in one of: a) real-time and b) periodically in batches.

In this regard, prior receiving the third model by at least one of the terminal devices or central nodes, the third model is aligned in time and space to mitigate time and space discrepancies in the third model. The communication between at least one of the terminal devices and another terminal device or at least one of the terminal devices and one of the central nodes by at least one central node is facilitated via the communication network. It will be appreciated that the moderation of communication through central node is utilized by terminal devices to align third models in time and space as the central node comprises stable point of connectivity for alignment of third models which enables in aligning the third models consistently without any errors regardless of any terminal device being temporarily or permanently decoupled from the communication. It will be also appreciated that the communication by central node(s), said communications are consolidated in a model based fashion and could be easily accessed (when needed) by individual terminals conserving terminal resources. It will be also appreciated that the multitude of third models are aligned in time and space to mitigate time and space discrepancies in the third models across plurality of terminal devices. It will be also appreciated that a real-time transmission of the aligned third models instantaneously transmits the aligned third models from the central node to at least one of the terminal devices or central nodes among the plurality of terminal devices and central nodes. Moreover, a periodic transmission of the aligned third models in batches relates to storing several the aligned third models over a period of time, and then transmitting all the aligned third models. In an example, the aligned third models may be transmitted periodically in batches after every 10 seconds or may be transmitted intermittently in batches after 10 seconds, and then again after 30 seconds, thus achieving adaptivity to achieve widest range operational capabilities of the respective terminal devices.

Optionally, the method further comprises moderating a communication between at least one of the terminal devices and another terminal device or at least one of the terminal devices and one of the central nodes by at least one central node, wherein the central node is configured to receive the manipulation information and align in time and space the manipulation information into aligned manipulation information and transmit the aligned manipulation information across time and space to at least one of the terminal devices or central nodes among the plurality of terminal devices and central nodes in one of: a) real-time and b) periodically in batches. It will be appreciated that the moderation of communication through central node is utilized by terminal devices to align manipulation information in time and space as the central node comprises stable point of connectivity for alignment of manipulation information which enables in aligning the manipulation information consistently without any errors regardless of any terminal device being temporarily or permanently decoupled from the communication. It will be also appreciated that the communication by central node(s), said communications are consolidated in a model based fashion and could be easily accessed (when needed) by individual terminals conserving terminal resources. It will be also appreciated that the multitude of manipulation information are aligned in time and space to mitigate time and space discrepancies in the manipulation information across plurality of terminal devices. It will be appreciated that a real-time transmission of the aligned manipulation information instantaneously transmits the aligned manipulation information from the central node to at least one of the terminal devices or central nodes among the plurality of terminal devices and central nodes. Moreover, a periodic transmission of the aligned manipulation information in batches relates to storing several the aligned manipulation information over a period of time, and then transmitting all the aligned manipulation information. In an example, the aligned manipulation information may be transmitted periodically in batches after every 10 seconds or may be transmitted intermittently in batches after 10 seconds, and then again after 30 seconds, thus achieving adaptivity to achieve widest range operational capabilities of the respective terminal devices.

Optionally, the method further comprises rendering at least one of the models on a user interface of at least one of the terminal devices among the plurality of terminal devices. It will be appreciated that the user interface facilitates interaction of a user with at least one of the models enabling the user to manipulate the models for advantage of improving their informational content and spatiotemporal awareness. The user interface allows the user to perform requisite operations (such as selection, viewing, manipulation, annotation, and the like) on the at least one model. Optionally, user interfaces are provided for terminal devices in a symmetric fashion. The user could annotate any object in at least one of the models and annotation timestamp corresponding to the time system associated with requisite model could be recorded at the time of annotation to constitute the manipulation of the models.

Throughout the present disclosure, the term "computer program product" refers to a software product comprising program instructions that are recorded on the non-transitory computer-readable storage medium, wherein the software product is executable upon a processing hardware for implementing the aforementioned steps of the method for aligning manipulations in time and space.

The non-transitory computer-readable storage medium can direct a computer (or other programmable data processing apparatus, or devices) to function in a particular manner, such that the program instructions stored in the non-transitory computer-readable storage medium cause a series of steps to implement the function specified in a flowchart and/or a schematic block diagram corresponding to the instructions. Examples of the non-transitory computer-readable storage medium include, but are not limited to, an electronic storage device, a magnetic storage device, an optical storage device, an electromagnetic storage device, a semiconductor storage device, a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, or any suitable combination thereof.

The present disclosure also relates to the system as described above. Various embodiments and variants disclosed above, with respect to the aforementioned first aspect, apply mutatis mutandis to the system.

Optionally, in the system, the first model comprises a virtual model, which comprises at least one of: a virtual model associated with a real-world object, a virtual model associated with an augmented reality object, a virtual model associated with a mixed reality object or a virtual model associated with a virtual reality object.

Optionally, in the system, the second model comprises a virtual model which comprises at least one of: a virtual model associated with a real-world environment, a virtual model associated with an augmented reality environment, a virtual model associated with a mixed reality environment or a virtual model associated with a virtual reality environment.

Optionally, in the system, the third model comprises a virtual model which comprises at least one of: a virtual model associated with the first model, a virtual model associated with the second model, a virtual model associated with composite of any of the models as a partial virtual model or as a complete virtual model, a position data, an orientation data, timing metadata, the timing metadata comprising at least an information about a time line of the third model in the form of a timestamp in the first time system associated with the first terminal device.

Optionally, in the system, the manipulation comprises at least one of: a position data, an orientation data, adding an additional model which comprises a virtual model which comprises at least one of: a virtual model associated with a real-world object, a virtual model associated with an augmented reality object, a virtual model associated with a mixed reality object or a virtual model associated with a virtual reality object.

Optionally, in the system, the manipulation information comprises at least one of: a position data, an orientation data, a virtual model associated with composite of any of the other models as a partial virtual model or as a complete virtual model, timing metadata, the timing metadata comprising at least an information about a timeline of manipulation information in the form of a timestamp in the first time system associated with the first terminal device.

Optionally, in the system, the creation of the manipulation information comprises snapping, by the second terminal device at the fifth instance of time corresponding to the fifth timestamp (t5) in the first time system associated with the first terminal device by mapping the manipulation information, from the third model, which the model correspond to the first timestamp (t1) from the first point of view (p1), to the updated third model, which the updated third model correspond to the first timestamp (t1) from the first point of view (p1).

Optionally, in the system, at least one of the models are recorded by at least one of the terminals as a change file along with a timestamp in a time system, which the time system is associated with a respective terminal device; and transmitting the change files across time and space to at least one of the terminal devices or central nodes among the plurality of terminal devices and central nodes in one of: a) real-time and b) periodically in batches.

Optionally, the system further comprises at least one central node, operating based on a third time system, communicatively accessible at least by one of the terminal devices or other central nodes via the communication network and configured to:

moderate a communication between at least one of the terminal devices and another terminal device or at least one of the terminal devices and one of the central nodes;

receive the third model along with a timestamp in the first time system, which the first time system is associated with the first terminal device, across time and space from at least one of the terminal devices or central nodes among the plurality of terminal devices and central nodes in one of: a) real-time and b) periodically in batches;

align the third models in time and space to aligned third model; and transmit the aligned third model along with a timestamp in the first time system, which the first time system is associated with the first terminal device, across time and space to at least one of the terminal devices or central nodes among the plurality of terminal devices and central nodes in one of: a) real-time and b) periodically in batches.

Optionally, the system comprises at least one central node, operating based on a third time system, communicatively accessible at least by one of the terminal devices or other central nodes via the communication network and configured to:

moderate a communication between at least one of the terminal devices and another terminal device or at least one of the terminal devices and one of the central nodes;

receive the manipulation information along with a timestamp in the first time system, which the first time system is associated with the first terminal device, across time and space from at least one of the terminal devices or central nodes among the plurality of terminal devices and central nodes in one of: a) real-time and b) periodically in batches;

align the manipulation information in time and space to aligned manipulation information; and transmit the aligned manipulation information along with a timestamp in the first time system, which the first time system is associated with the first terminal device, across time and space to at least one of the terminal devices or central nodes among the plurality of terminal devices and central nodes in one of: a) real-time and b) periodically in batches;

Optionally, the system comprises at least one central node, operating based on a third time system, communicatively accessible at least by one of the terminal devices or other central nodes via the communication network and configured to:

moderate a communication between at least one of the terminal devices and central nodes among the plurality of terminal devices and central nodes;

receive at least one of the models as a change file along with a timestamp in the third time system, which the third time system is associated with the central nodes, receiving the change files across time and space from at least one of the terminal devices or central nodes among the plurality of terminal devices and central nodes in one of: a) real-time and b) periodically in batches;

record at least one of the models as a change file along with a timestamp in the third time system, which the third time system is associated with the central nodes, recording the change files across time and space to at least one of the central nodes among the plurality of central nodes in one of: a) real-time and b) periodically in batches; and transmit at least one of the models as a change file along with a timestamp in the third time system, which the third time system is associated with the central nodes, transmitting the change files across time and space to at least one of the terminal devices or central nodes among the plurality of terminal devices and central nodes in one of: a) real-time and b) periodically in batches.

Optionally, in the system, each of the plurality of terminal devices is configured to render at least one of the models on a user interface of at least one of the terminals from among the plurality of terminals.

DETAILED DESCRIPTION OF THE DRAWINGS

Figure 1B:
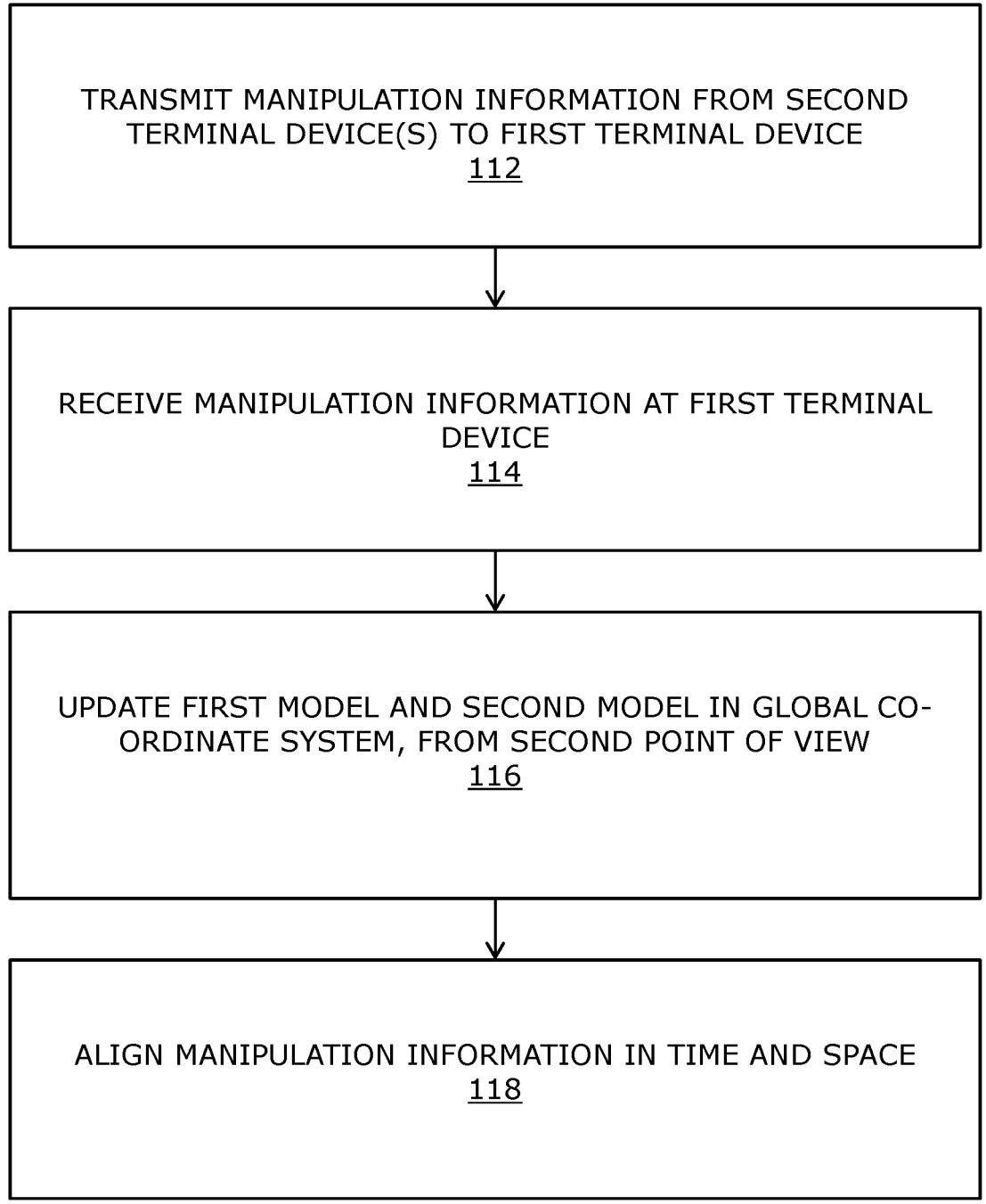

Referring to FIGS. 1A, 1B, illustrated are steps of a method for aligning manipulations in time and space to a first model of a three-dimensional real-world object in a second model of a three-dimensional real-world environment, in accordance with an embodiment of the present disclosure. At step 102, there is generated, by a first terminal device from among a plurality of terminal devices, a third model based on the first model and the second model, in a global co-ordinate system associated with the second model, from a first point of view (p1) of the first terminal device in relation to the three-dimensional object in the three-dimensional real-world environment at a first instance of time corresponding to a first timestamp (t1) in a first time system, which the first time system is associated with the first terminal device. At step 104, the third model and a timing metadata associated with the first timestamp (t1) in the first time system associated with the first terminal device are transmitted by the first terminal device to at least one second terminal device from among the plurality of terminal devices, at a second instance of time corresponding to a second timestamp (t2) in the first time system. At step 106, the third model and the timing metadata are received at the at least one second terminal device at a third instance of time corresponding to a third timestamp (t3) in the first time system associated with the first terminal device. At step 108, the received third model is manipulated by the at least one second terminal device at a fourth instance of time corresponding to a fourth timestamp (t4) in the first time system associated with the first terminal device. At step 110, a manipulation information is created based on the manipulations associated with the timing metadata of the first timestamp (t1) at a fifth instance of time corresponding to a fifth timestamp (t5) in the first time system associated with the first terminal device. At step 112, the manipulation information is transmitted from the at least one second terminal device to the first terminal device at a sixth instance of time corresponding to a sixth timestamp (t6) in the first time system associated with the first terminal device. At step 114, the manipulation information is received at the first terminal device at a seventh instance of time corresponding to a seventh timestamp (t7) in the first time system associated with the first terminal device. At step 116, the first model and the second model are updated, by a first terminal device, in the global co-ordinate system associated with the second model, from a second point of view (p2) of the first terminal device in relation to the three-dimensional object in the three-dimensional real-world environment at an eighth instance of time corresponding to an eighth timestamp (t8) in the first time system, which the first time system is associated with the first terminal device. At step 118, the manipulation information is aligned, by the first terminal device, in time and space at a ninth instance of time corresponding to a ninth timestamp (t9) in the first time system associated with the first terminal device by mapping the manipulation information, from the first model and the second model, which the models correspond to the first timestamp (t1) from the first point of view (p1), to the updated first model and the updated second model, which the updated models correspond to the eighth timestamp (t8) from the second point of view (p2).

The steps 102, 104, 106, 108, 110, 112, 114, 116, and 118 are only illustrative and other alternatives can also be provided where one or more steps are added, one or more steps are removed, or one or more steps are provided in a different sequence without departing from the scope of the claims herein.

Figure 2:
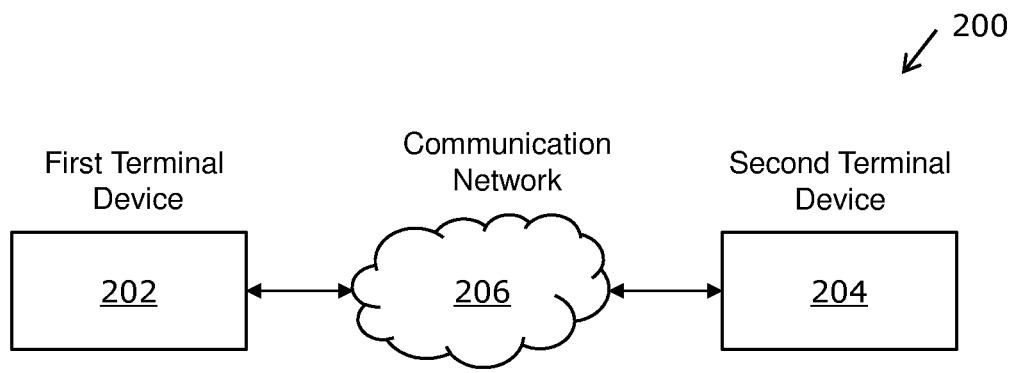
FIGS. 2 and 3 are schematic illustrations of a system for aligning manipulations in time and space to a first model of a three-dimensional real-world object in a second model of a three-dimensional real-world environment, in accordance with different embodiments of the present disclosure.

Referring to FIG. 2, illustrated is a schematic illustration of a system 200 for aligning manipulations in time and space to a first model of a three-dimensional real-world object in a second model of a three-dimensional real-world environment, in accordance with an embodiment of the present disclosure. The system 200 comprises a first terminal device 202 and a second terminal device 204, and a communication network 206 for providing communicative accessibility between at least the first terminal device 202 and the second terminal device 204.

Figure 3:
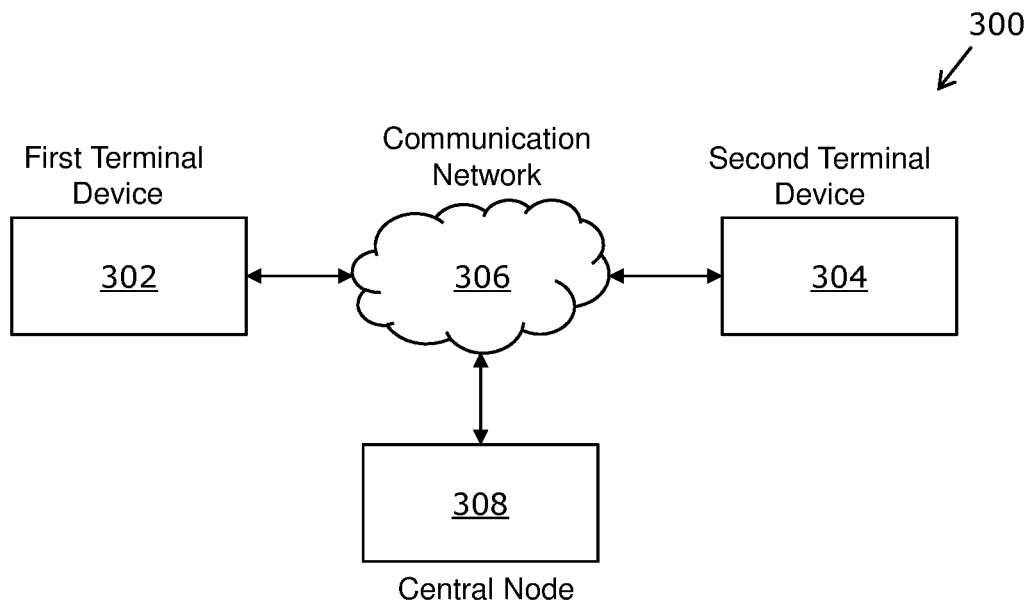

Referring to FIG. 3, illustrated is a schematic illustration of a system 300 for aligning manipulations in time and space to a first model of a three-dimensional real-world object in a second model of a three-dimensional real-world environment, in accordance with another embodiment of the present disclosure. The system 300 comprises a first terminal device 302 and a second terminal device 304, and a communication network 306 for providing communicative accessibility between at least the first terminal device 302 and the second terminal device 304. The system 300 further comprises at least one central node (depicted as a central node 308), communicatively accessible at least by one of the terminal devices 302 and 304 or other central nodes via the communication network 306.

Figure 4:
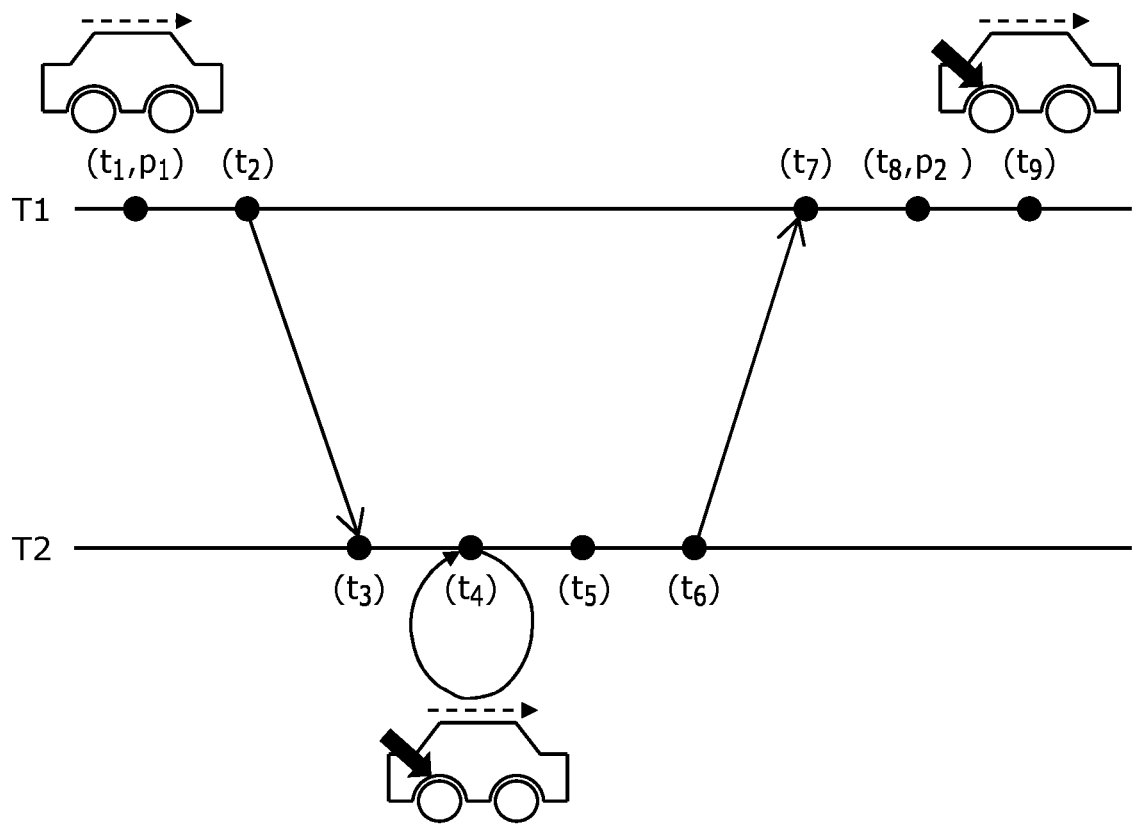
FIG. 4 illustrates a timing diagram pertaining to alignment of manipulations in time and space to a first model of a three-dimensional real-world object in a second model of a three-dimensional real-world environment, in accordance with an embodiment of the present disclosure.

Referring to FIG. 4, illustrated is a timing diagram 400 pertaining to alignment of manipulations in time and space to a first model of a three-dimensional real-world object in a second model of a three-dimensional real-world environment, in accordance with an embodiment of the present disclosure. T1 corresponds to a first terminal device whereas T2 corresponds to a second terminal device. At a first instance of time corresponding to a first timestamp $t_1$ in a first time system of the first terminal device, the first terminal device generates a third model based on the first model and the second model, in a global co-ordinate system associated with the second model, from a first point of view $p_1$ of the first terminal device in relation to the three-dimensional object in the three-dimensional real-world environment. At a second instance of time corresponding to a second timestamp $t_2$ in the first time system, the third model and a timing metadata associated with the first timestamp $t_1$ in the first time system is transmitted by the first terminal device to at least one second terminal device. At a third instance of time corresponding to a third timestamp $t_3$ in the first time system, the third model and the timing metadata are received at the at least one second terminal device. At a fourth instance of time corresponding to a fourth timestamp $t_4$ in the first time system, the received third model is manipulated by the at least one second terminal device. At a fifth instance of time corresponding to a fifth timestamp $t_5$ in the first time system, a manipulation information is created based on the manipulations associated with the timing metadata of the first timestamp $t_1$. At a sixth instance of time corresponding to a sixth timestamp $t_6$ in the first time system, the manipulation information is transmitted from the at least one second terminal device to the first terminal device. At a seventh instance of time corresponding to a seventh timestamp $t_7$ in the first time system, the manipulation information is received at the first terminal device. At an eighth instance of time corresponding to an eighth timestamp $t_8$ in the first time system, the first terminal device updates the first model and the second model, in the global co-ordinate system associated with the second model, from a second point of view $p_2$ of the first terminal device in relation to the three-dimensional object in the three-dimensional real-world environment. At a ninth instance of time corresponding to a ninth timestamp $t_9$ in the first time system, the manipulation information is aligned by the first terminal device, in time and space by mapping the manipulation information, from the first model and the second model, which the models correspond to the first timestamp $t_1$ from the first point of view $p_1$, to the updated first model and the updated second model, which the updated models correspond to the eighth timestamp $t_8$ from the second point of view $p_2$.

Figure 5:
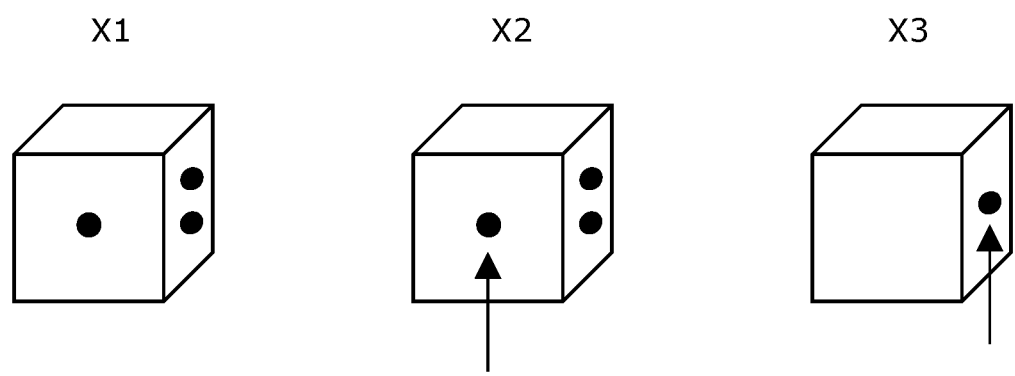
FIG. 5 illustrates an exemplary use case of alignment of manipulations in time and space corresponding different instances of time, in accordance with an embodiment of the present disclosure.

Referring to FIG. 5, illustrated is an exemplary use case of alignment of manipulations in time and space corresponding to different instances of time, in accordance with an embodiment of the present disclosure. These manipulations are made to a first model of a three-dimensional real-world object (depicted as a cube) in a second model of a three-dimensional real-world environment. The different instances of time correspond to timestamps X1, X2, and X3 in a first time system of a first terminal device. At the instance of time corresponding to the timestamp X1, a third model is generated based on the first model and the second model, in a global co-ordinate system associated with the second model, from a first point of view of the first terminal device in relation to the three-dimensional object in the three-dimensional real-world environment. At the instance of time corresponding to the timestamp X2, the third model is manipulated (for example, by addition of an arrow) by at least one second terminal device. Then, a manipulation information is created based on the manipulations associated with timing metadata of the timestamp X1. At the instance of time corresponding to the timestamp X3, the manipulation information is aligned by the first terminal device, in time and space by mapping the manipulation information, from the first model and the second model, wherein the models correspond to the timestamp X1 from the first point of view, to updated first model and updated second model that correspond to a second point of view.

Figure 6:
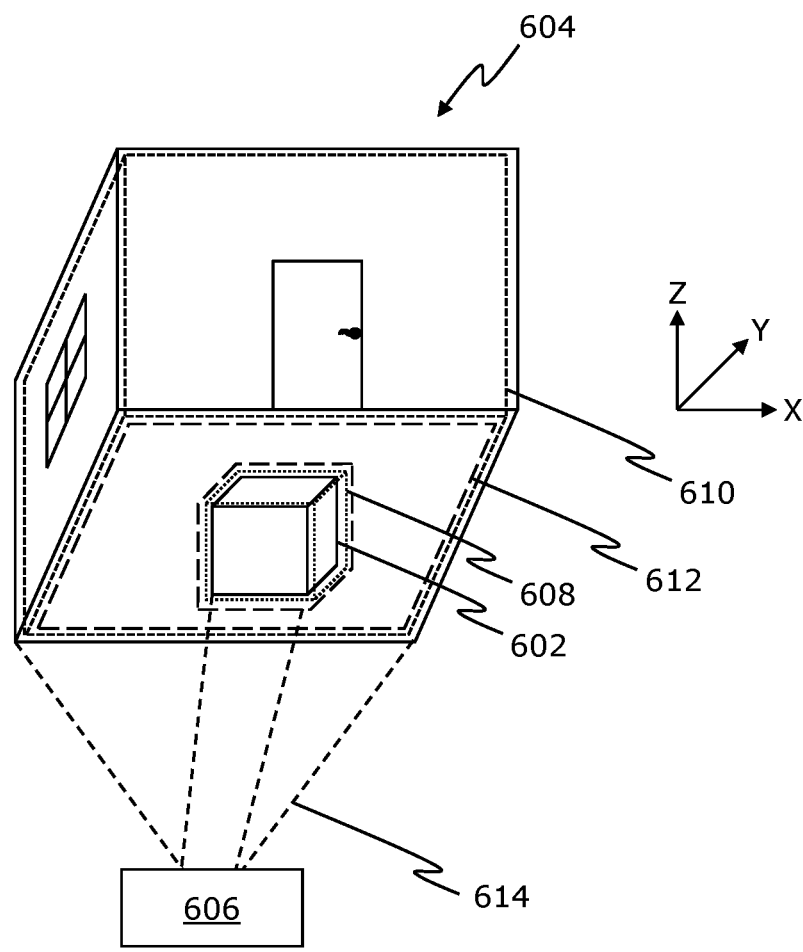
FIG. 6 is an exemplary physical diagram pertaining to alignment of manipulations in time and space, in accordance with an embodiment of the present disclosure.

Referring to FIG. 6, illustrated is an exemplary physical diagram pertaining to alignment of manipulations in time and space, in accordance with an embodiment of the present disclosure. The manipulations are made to a first model (depicted using round-dotted lines) 608 of a three-dimensional real-world object 602 in a second model (depicted using square-dotted lines) 610 of a three-dimensional real-world environment 604. A third model (depicted using long-dashed lines) 612 is generated based on the first model and the second model, in a global co-ordinate system (depicted as a co-ordinate system having X, Y, and Z axes) associated with the second model, from a first point of view (depicted using small-dashed lines) 614 of a first terminal device 606 in relation to the three-dimensional object 602 in the three-dimensional real-world environment 604.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for aligning manipulations in time and space to a first model of a three-dimensional real-world object in a second model of a three-dimensional real-world environment said method comprising:
   generating, by a first terminal device from among a plurality of terminal devices, a third model based on the first model and the second model, in a global co-ordinate system associated with the second model, from a first point of view of the first terminal device in relation to the three-dimensional object in the three-dimensional real-word environment at a first instance of time corresponding to a first timestamp in a first time system, which the first time system is associated with the first terminal device;
   transmitting the third model and a timing metadata associated with the first timestamp in the first time system associated with the first terminal device by the first terminal device to at least one second terminal device from among the plurality of terminal devices, at a second instance of time corresponding to a second timestamp in the first time system;
   receiving the third model and the timing metadata at the at least one second terminal device at a third instance of time corresponding to a third timestamp in the first time system associated with the first terminal device;
   manipulating the received third model by the at least one second terminal device at a fourth instance of time corresponding to a fourth timestamp in the first time system associated with the first terminal device;
   creating manipulation information based on the manipulating of the received third model at the fourth timestamp at a fifth instance of time corresponding to a fifth timestamp in the first time system associated with the first terminal device;
   transmitting the manipulation information from the at least one second terminal device to the first terminal device at a sixth instance of time corresponding to a sixth timestamp in the first time system associated with the first terminal device;
   receiving the manipulation information at the first terminal device at a seventh instance of time corresponding to a seventh timestamp in the first time system associated with the first terminal device;
   updating, by the first terminal device, the first model and the second model based on the manipulating of the received third model at the fourth time stamp, in the global co-ordinate system associated with the second model, from a second point of view of the first terminal device in relation to the three-dimensional object in the three-dimensional real-word environment at an eighth instance of time corresponding to an eighth timestamp in the first time system, which the first time system is associated with the first terminal device; and
   aligning, by the first terminal device the manipulation information, in time and space at a ninth instance of time corresponding to a ninth timestamp in the first time system associated with the first terminal device by mapping the manipulation information to the updated first model and the updated second model corresponding to the eighth timestamp from the second point of view.

2. The method according to claim 1, wherein the first model comprises a virtual model, which comprises at least one of: a virtual model associated with a real-world object, a virtual model associated with an augmented reality object, a virtual model associated with a mixed reality object or a virtual model associated with a virtual reality object.

3. The method according to claim 1, wherein the second model comprises a virtual model which comprises at least one of: a virtual model associated with a real-world environment, a virtual model associated with an augmented reality environment, a virtual model associated with a mixed reality environment or a virtual model associated with a virtual reality environment.

4. The method according to claim 1, wherein manipulating the received third model by the at least one second terminal comprises at least one of: manipulating position data, manipulating orientation data, and adding an additional model which comprises a virtual model which comprises at least one of: a virtual model associated with a real-world object, a virtual model associated with an augmented reality object, a virtual model associated with a mixed reality object or a virtual model associated with a virtual reality object.

5. The method according to claim 1, wherein the manipulation information associated with the received third model comprises information pertaining to at least one of: manipulated position data of the received third model, manipulated orientation data of the received third model, a manipulated virtual model associated with a composite of any of the first model or the second model as a partial virtual model or as a complete virtual model, timing metadata associated with the received third model, the timing metadata associated with the received third model comprising at least information about a time line of manipulation information in the form of a timestamp in the first time system associated with the first terminal device.

6. The method according to claim 1, further comprising recording at least one of the first model, second model or received third model by at least one of the first terminal device or the second terminal device as a change file along with a timestamp in the first time system of the first terminal device; and transmitting the change files across time and space to at least one of the plurality of terminal devices or a central node among the plurality of terminal devices in one of real-time or periodically in batches.

7. The method according to claim 1, further comprising moderating a communication between one or more of the first terminal device and the second terminal device and a central node, wherein the central node is configured to receive the third model, align the third model and transmit the aligned third model to at least one of the first terminal device, second terminal device or central node in one of real-time or periodically in batches.

8. The method according to claim 1, further comprising moderating a communication between one or more of the first terminal device and the second terminal device and a central node among the plurality of terminal devices, wherein the central node is configured to receive the manipulation information, align the manipulation information and transmit the aligned manipulation information to at least one of the first terminal device, the second terminal device or central node in one of real-time or periodically in batches.

9. The method according to claim 1, further comprising recording at least one of the first model, second model or received third model by at least one central node among the plurality of terminal devices as a change file along with a timestamp in a third time system, which the third time system is associated with the at least one central node; and transmit the change files to at least one of the plurality of terminal devices or at least one central node in one of real-time or periodically in batches.

10. The method according to claim 1, wherein the method further comprises rendering at least one of the first model, the second model or the received third model on a user interface of at least one of the plurality of terminal devices.

11. A system for aligning manipulations in time and space to a first model of a three-dimensional real-world object in a second model of a three-dimensional real-world environment, said system comprising:
a first terminal device from among a plurality of terminal devices, associated with the three-dimensional real-word environment, operating in a first time system;
at least one second terminal device from among the plurality of terminal devices, associated with the same or another three-dimensional real-world environment, operating in a second time system; and
a communication network for providing communicative accessibility between at least the first terminal device and the second terminal device,
wherein:
the first terminal device is configured to:
generate a third model based on the first model and the second model, in a global co-ordinate system associated with the second model, from a first point of view (p1) of the first terminal device in relation to the three-dimensional object in the three-dimensional real-word environment at a first instance of time corresponding to a first timestamp in the first time system;
and
transmit, via the communication network, the third model and a timing metadata associated with the first timestamp in the first time system to the at least one second terminal device, at a second instance of time corresponding to a second timestamp in the first time system; and
the at least one second terminal device is configured to:
receive the third model and a timing metadata at a third instance of time corresponding to a third timestamp in the first time system associated with the first terminal device;
manipulate the third model at a fourth instance of time corresponding to a fourth timestamp in the first time system associated with the first terminal device;
create manipulation information based on the manipulating of the third model at the fourth instance of time at a fifth instance of time corresponding to a fifth timestamp in the first time system associated with the first terminal device; and
transmit, via the communication network, the manipulation information to the first terminal device at a sixth instance of time corresponding to a sixth timestamp in the first time system associated with the first terminal device; and
the first terminal device is further configured to:
receive, via the communication network, the manipulation information at a seventh instance of time corresponding to a seventh timestamp in the first time system;
update the first model and the second model based on the manipulating of the third model at the fourth instance of time, in a global co-ordinate system associated with the second model, from a second point of view of the first terminal device in relation to the three-dimensional object in the three-dimensional real-word environment at an eighth instance of time corresponding to an eighth timestamp in the first time system; and aligning the manipulation information, in time and space at a ninth instance of time corresponding to a ninth timestamp in the first time system associated with the first terminal device by mapping the manipulation information to the updated first model and the updated second model corresponding to the eighth timestamp from the second point of view.

12. The system according to claim 11, wherein the first model comprises a virtual model, which comprises at least one of: a virtual model associated with a real-world object, a virtual model associated with an augmented reality object, a virtual model associated with a mixed reality object or a virtual model associated with a virtual reality object.

13. The system according to claim 11, wherein the second model comprises a virtual model which comprises at least one of: a virtual model associated with a real-world environment, a virtual model associated with an augmented reality environment, a virtual model associated with a mixed reality environment or a virtual model associated with a virtual reality environment.

14. The system according to claim 11, wherein manipulating the third model at the fourth instant of time comprises at least one of: a position data, an orientation data, adding an additional model which comprises a virtual model which comprises at least one of: a virtual model associated with a real-world object, a virtual model associated with an augmented reality object, a virtual model associated with a mixed reality object or a virtual model associated with a virtual reality object.

15. The system according to claim 11, wherein the manipulation information associated with the third model comprises at least one of: manipulated position data of the third model, manipulated orientation data of the third model, a manipulation of a virtual model associated with a composite of any of the first model or the second model as a partial virtual model or as a complete virtual model, timing metadata associated with the third model, the timing metadata comprising at least an information about a timeline of manipulation information in the form of a timestamp in the first time system associated with the first terminal device.

16. The system according to claim 11, comprising recording at least one of the first model, second model or third model by at least one of the first terminal device or the second terminal device as a change file along with a timestamp in the first time system of the first terminal device; and transmitting the change files across time and space to at least one of the plurality of terminal devices or a central node among the plurality of terminal devices and central nodes in one of: a) real-time and b) periodically in batches.

17. The system according to claim 11, further comprising at least one central node among the plurality of terminal devices, operating based on a third time system, communicatively accessible at least by one of the plurality of terminal devices or another one of the at least one central via the communication network, the at least one central node being configured to:

moderate a communication between at least one of the plurality of terminal devices and another one of the plurality of terminal devices or at least one of the plurality of terminal devices and the another one of the at least one central node;

receive the third model along with a timestamp in the first time system from at least one of the plurality of terminal devices or at least one central node in one of real-time or periodically in batches;

align the third model in time and space; and transmit the aligned third model along with a timestamp in the first time system to at least one of the plurality of terminal devices or the at least one central node in one of real-time or periodically in batches.

18. The system according to claim 11, comprising at least one central node among the plurality of terminal devices, operating based on a third time system, communicatively accessible at least by one of the plurality of terminal devices or another one of the at least one central node via the communication network, the at least one central node being configured to:

moderate a communication between at least one of the plurality of terminal devices and another one of the plurality of terminal devices or at least one of the plurality of terminal devices and the another one of the at least one central node;

receive the manipulation information along with a timestamp in the first time system from at least one of the plurality of terminal devices or the at least one central node in one of real-time or periodically in batches;

align the manipulation information in time and space; and transmit the aligned manipulation information along with a timestamp in the first time system to at least one of the plurality of terminal devices or at least one central node in one of real-time or periodically in batches.

19. The system according to claim 11, comprising at least one central node among the plurality of terminal devices, operating based on a third time system, communicatively accessible at least by one of the plurality of terminal devices or an other on of the at least one central node via the communication network, the at least one central node being configured to:

moderate a communication between at least one of the plurality of terminal devices and the other one of the at least one central node;

receive at least one of the first model, second model or third model as a change file along with a timestamp in the third time system, which the third time system is associated with the at least one central node, receiving the change files from at least one of the plurality of terminal devices or the at least one central node in one of real-time and periodically in batches;

record at least one of the first model, the second model or the third model as a change file along with a timestamp in the third time system, recording the change file to at least one of the at least one central node in one of real-time and periodically in batches; and transmit at least one of the first model, the second model or the third model as a change file along with a timestamp in the third time system to at least one of the plurality of terminal devices or the at least one central node in one of real-time or periodically in batches.

20. The system according to claim 11, wherein each of the plurality of terminal devices is configured to render at least one of the first mode, the second model and the third model models on a user interface of at least one of the plurality of terminal devices.

21. A computer program product comprising a non-transitory computer-readable storage medium having computer-readable instructions stored thereon, the computer-readable instructions being executable by at least one terminal device from among the plurality of terminal devices or at least one of central node among the plurality of terminal devices, comprising processing hardware to execute a method as claimed in claim 1.

* * * * *